United States Patent [19]
Gentit

[11] Patent Number: 5,987,418
[45] Date of Patent: Nov. 16, 1999

[54] SYNCHRONOUS DECODING OF PACKETIZED AUDIO FOR DIFFERENT REPRODUCTION MODES

[75] Inventor: Jean Marc Gentit, Meylan, France

[73] Assignee: Thomson multimedia, Boulogne Cedex, France

[21] Appl. No.: 09/205,479

[22] Filed: Dec. 4, 1998

[30] Foreign Application Priority Data

Dec. 8, 1997 [DE] Germany .......................... 197 54 297

[51] Int. Cl.⁶ .................................................. G10L 3/02
[52] U.S. Cl. .......................................... 704/500; 704/201
[58] Field of Search ................................... 704/500–504, 704/200, 201; 348/462; 386/97, 99

[56] References Cited

U.S. PATENT DOCUMENTS

| | | |
|---|---|---|
| 4,805,217 | 2/1989 | Morihiro et al. ....................... 704/211 |
| 5,502,496 | 3/1996 | Hailey et al. ........................... 348/462 |
| 5,659,793 | 8/1997 | Escobar et al. ......................... 345/302 |
| 5,748,835 | 5/1998 | Lee ......................................... 386/104 |
| 5,774,857 | 6/1998 | Newlin .................................... 704/271 |

*Primary Examiner*—David R. Hudspeth
*Assistant Examiner*—Donald L. Storm
*Attorney, Agent, or Firm*—Joseph S. Tripoli; Eric P. Herrmann

[57] ABSTRACT

Dolby AC-3 and MPEG-2 audio permit the transmission of audio signals in packet form, via more than two independent audio channels. If a reproduction device has only a two channel audio decoder an external multi channel audio decoder may be used for multi channel audio reproduction. In this instance, packetized signal is received by a first decoder and is decoded for a first mode of reproduction and applied to a reproduction device. The received signal is unpacked in the first decoder and stored in memory. The stored signal is reformatted for application to a second decoder for decoding and reproduction according to a second mode of reproduction.

3 Claims, 3 Drawing Sheets

SYNCHRONOUS DECODING OF PACKETIZED AUDIO FOR DIFFERENT REPRODUCTION MODES

FIELD OF THE INVENTION

This invention relates to a method and to an apparatus for decoding digital audio data.

BACKGROUND OF THE INVENTION

Audio coding systems like Dolby AC-3 and MPEG-2 Audio permit the transmission of high quality audio signals, especially the transmission of multi channel audio. Defining the possible configurations for reproduction by "x/y", wherein x is the number of the front channels and y is the number of the surround channels, then e.g. with Dolby AC-3 the following configurations for reproduction are possible: 3/2, 3/1, 2/2, 3/0, 2/1, 2/0, 1/0. In addition a low frequency channel can be transmitted.

In order to make possible such a multi channel sound reproduction the transmitted audio data stream has to be decoded by an appropiate multi channel audio decoder. In case, however, the device designated for reproduction contains only a two channel audio decoder then a multi channel audio reproduction can be performed only by using an external multi channel audio decoder. The audio data are output therein via a serial digital interface from the reproduction device to the multi channel decoder. In case the output of the audio signals shall occur in companying a video signal as for example for reproduction of a movie stored on a DVD, a method for synchronization is needed in order to achieve a lip synchronization between reproduction of picture and multi channel sound.

SUMMARY OF THE INVENTION

It is an object of the invention to provide a simple method and an apparatus with simple hardware means decoding data for a first mode of reproduction and providing data for a decoding for a second mode of reproduction. This object is solved by the method defined in claim 1 and by the apparatus defined in claim 2.

In principle the method according to the invention for decoding digital audio data being present in form of packets includes the following steps:

first data are received by the first decoder, the first data are decoded for a first mode of reproduction and are fed to a reproduction unit, the first data are depacketted for decoding for a second mode of reproduction after being received in the first decoder and are deposited as second data in a memory, and the second data is read and formatted for purpose of output from the memory.

The method is particularly applicable if the first and second data include multi channel audio signals transmitted in frames which theirselves may be divided into blocks.

The multi channel audio signals have been coded therein preferably according to a MPEG-2-Audio-, Dolby-AC-3- algorithm or to another audio option of the DVD.

The method can be used with a particular advantage if the first decoder is a two channel audio decoder for a first mode of reproduction and the second decoder is a multi channel audio decoder for a second mode of reproduction.

Furthermore it is advantageous if said first data are depacketted after receiption and are deposited in a memory and are read out from the memory for being output to a terminal for a second decoder and then are formatted.

The method is especially advantageous if the first decoder decodes audio signals from the first data said audio signals having been output in sychronism with video signals having been transmitted together with audio signals in a common data stream and having been decoded by a video decoder.

In principle said apparatus for carrying out the inventive method consists in the feature that the first decoder includes beside a processor for process control and decoding of the first data one or more of the following units:

one or several memories for storing the first data during its reception and/or for temporary storing during processing of the first data;

a depacketing unit for depacketing the received data into one elementary stream;

a formatting unit performing a formatting for the preferably serial output via an interface.

BRIEF DESCRIPTION OF THE DRAWINGS

By means of the drawings examples of embodiments of the inventions will now be described. The drawings show in FIG. 1 an arrangement consisting of a reproduction device including a two channel audio decoder and an external multi channel audio decoder, FIG. 2 a block diagram of the two channel audio decoder, FIG. 3 the synchronous decoding of audio data by two decoders synchronized according to the invention.

DETAILED DESCRIPTION OF PREFERRED EMBODIMENTS

Figure 1:
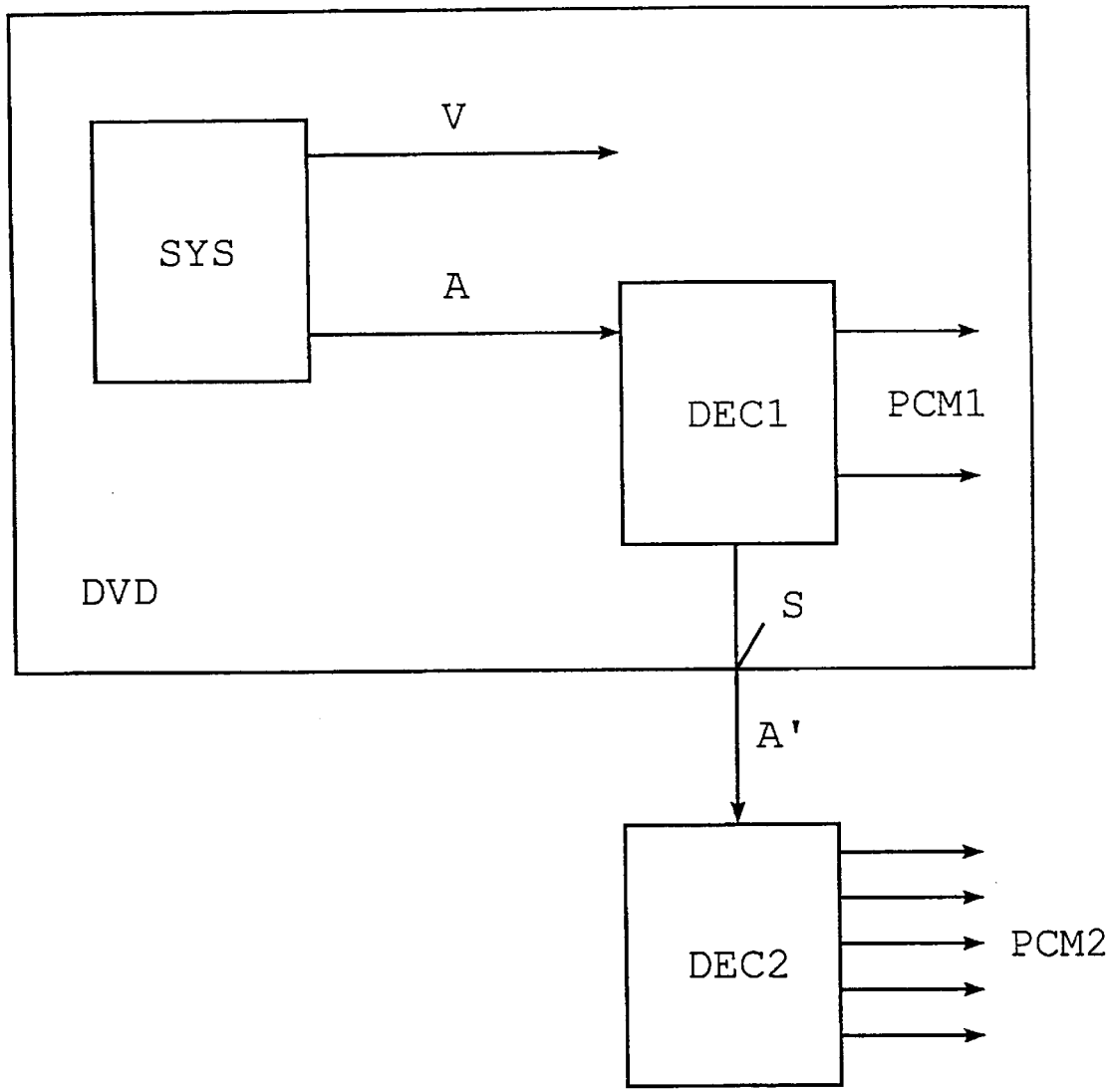

FIG. 1 schematically shows a DVD player DVD and an external multi channel audio decoder DEC2 connected thereto. Therein only those components are shown being essential for the present invention. All other components are known to the man skilled in the art and need not be modified for implementing the method according to the invention. The system controller and demultiplexer SYS provide a video data stream V and an audio data stream A. Furthermore said SYS evaluates among others time marks included in said data stream and sends commands for synchronization to the decoder DEC1. The decoder DEC1, besides decoding the audio data, further performs a formatting for a serial output of the data. Furthermore there occurs a depacketing of the PES data stream to an elementary data stream. The elementary data stream is subjected a further signal processing until an output of PCM audio signals occurs. As the decoder DEC1 only is a two channel decoder only an output of stereo signals can be achieved by said decoder. The multi channel audio decoder is supplied via a serial interface, e.g. IEC 985 (IEC 1937) or IEC 1394 also the data of the elementary data stream. By this decoder now a multi channel audio decoding is performed which may take place by use of the so-called down mixing technique in dependence from the respective configuration of reproduction. There are output by the multi channel audio decoder DEC2 also PCM audio signals PCM2.

The synchronization of said two decoders DEC1 and DEC2 takes place in the following manner. The two channel audio decoder DEC1 includes a counting register which is set by the system controller SYS. The relevant value therein depends from the coding method used, like e.g. AC-3, MPEG-2, audio, DTS or SDDS, further from the transmission velocity of the serial interface and/or from the respective present data rate. The value of the counting variable preferably is derived from a table. The two channel audio decoder DEC1 in each case immediately starts with sending its received data wherein the following processes are performed: after the data has been received and additionally might have been depacketed by the program stream to the elementary data stream they are deposited in a memory. For being output said data are again read from the memory, then formatted and then output via the serial interface. Therein with each reading operation from the memory the counting register is decremented. The register reaching the value "0" signals to the two channel audio decoder DEC1 that the multi channel audio decoder DEC2 starts with decoding and processing. Then the two channel audio decoder in this point of time initiates the decoding and the processing. Thereby there is assured the synchronization between both decoders DEC1 and DEC2.

Condition for a successful synchronization is an appropriate choice of the value of the counting variable with allocation to the counting register. There is selected for the value of the counting variable preferably the number of the code words which are necessary in order that the decoding can be started. For each data word which is read the counting register is reduced by one data word. In case the Dolby AC-3 method is used the audio data are transmitted in frames with a size of 896 words respectively with an AC-3 data rate of 448 kbps. An AC-3 decoder is enabled to start with decoding if, dependent from the respective implementation, ⅔ of a frame or an entire frame is present. Therefore the register in this case should be set with a value of 560 words as this corresponds to about ⅔ of the 896 words. In case a MPEG-2 audio coding method is used then an entire frame has to be present for the start of decoding.

Figure 2:
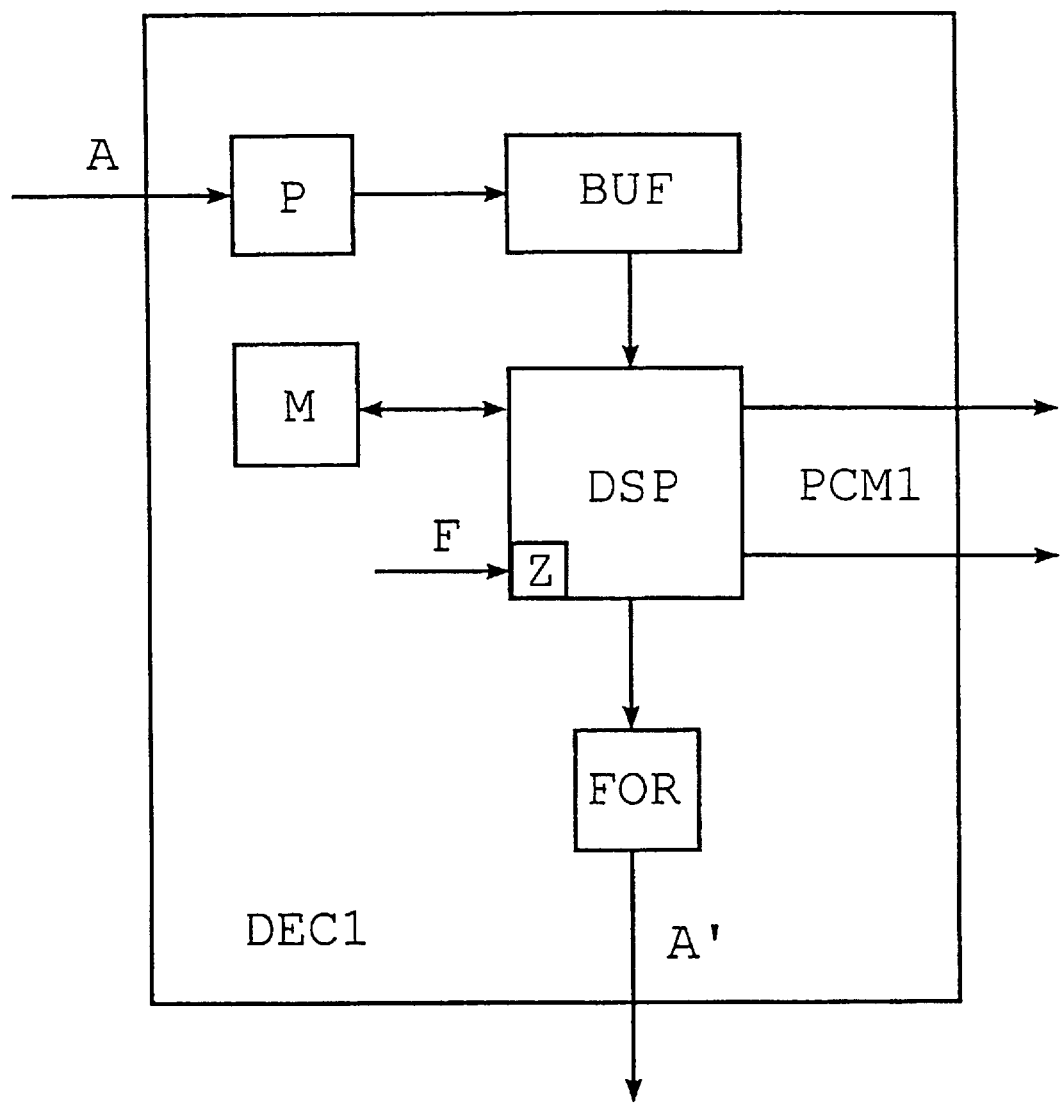

FIG. 2 shows a block diagram of the decoder of FIG. 1. The audio data stream A is fed to a depacketing unit P which depackets the PES data stream into the elementary data stream. The audio data of the elementary data stream are for the first stored in a buffer BUF and then fed to a processor unit DSP which ensures the process control and performs the actual data decoding. A further memory M is provided for temporary storage of data. The data are fed to a formatting device FOR which outputs the formatted data A' for a serial output. A value F is allocated to the counting register which value is decremented at each reading operation from the buffer BUF. If value "0" is reached then the processor unit DSP starts with the decoding operation. Finally the output of the decoded audio PCM1 data takes place.

Figure 3:
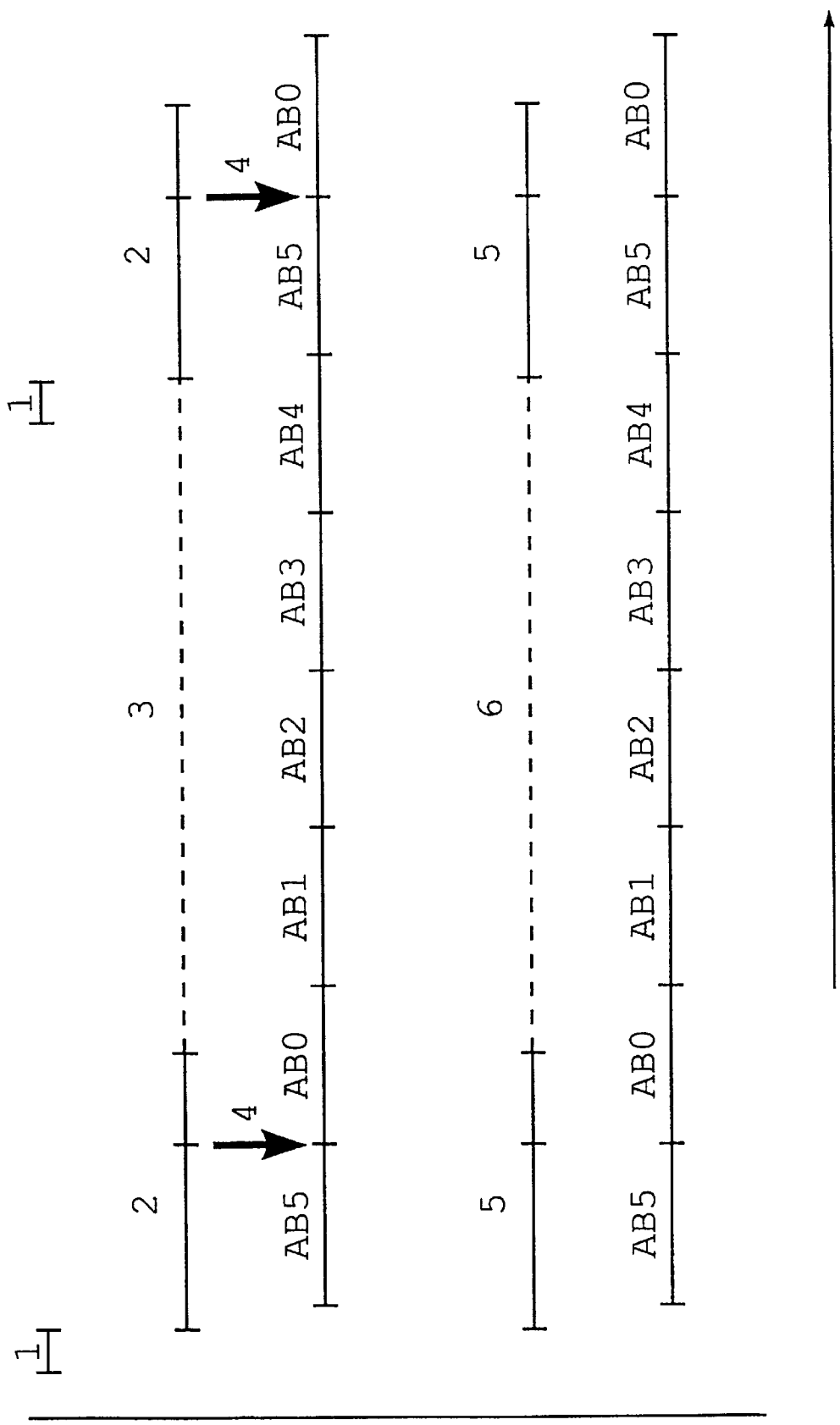

The synchronous decoding operation of the audio data by said two decoders DEC1 and DEC2 is shown in FIG. 3 for the example of Dolby AC3 coded data. First of all data including a burst 1 with a high data rate, e.g. 10 Mbps, is read in. For reading in an entire frame with a size of 896 words a time of 1.43 ms is needed. Immediately after reading in the complete frame there occurs an output 2 of the data to the external decoder DEC2. This output also takes place in form of bursts, however with a smaller data rate. In this way the use of an interface IEC 1937 an useful data burst rate of 1,536 Mbps is achieved for $f_s$=48 kHz. Therefrom follows a transmission rate of 6.2 ms for ⅔ of one frame and 9.3 ms for a complete frame. After the complete frame has been transmitted for the first no further data are transmitted, symbolised by the interval 3. If ⅔ of one frame have been transmitted to the decoder DEC2 than the counting register reaches the value "0" and an internal interrupt 4 is generated. Now decoding of the frame begins beginning with the first audio block AB0 and then proceeding with the further audio blocks AB1, AB2, AB3, AB4 and AB5 of the frame. Thereupon follows the decoding of the next frame. The burst input 5 of the data at decoder DEC2 occurs at the same time as the output of this frame from decoder DEC1. If ⅔ of the frame have been transmitted the decoder DE2 immediately starts with decoding the audio blocks AB0 up to AB5, wherein however an internal interrupt is not needed for this. Also in this case there are present between the burst inputs intervals 6 during which no useful data is transmitted.

The invention can be used for the decoding of digital audio data by any two decoders. Especially the invention is suitable for a synchronously providing digital audio data for an external multi channel decoder including an internal two channel audio decoder being part of a reproduction device for audio and/or video data. The reproduction device can be a device for reading out optical picture discs, like e.g. a DVD player, a digital video recorder, like e.g. a DVD device, a television receiving device for digital TV signals, a set-top-box, other devices of entertainment electronic or a computer. An application in a DVD player including an internal two channel audio decoder has considerable advantages for enabling a decoding of multi channel audio signals which may be output by an external multi channel AV receiver.

I claim:

1. A method of processing compressed digital audio available in packetized format, comprising:

receiving the packetized compressed digital audio signal;

depacketizing said packetized compressed digital audio signal;

decoding at least a portion of depacketized said compressed digital audio signal in a first decoder, for reproduction according to a first mode;

applying depacketized said compressed digital audio signal to memory for storage;

retrieving depacketized compressed digital audio signal from said memory; and reformatting depacketized compressed digital audio signal retrieved from memory, for transmission to a second decoder and decoding therein and reproduction according to a second mode, different from said first mode.

2. Apparatus for decoding compressed digital audio program signal available in packetized format, said apparatus comprising;

a depacketizer for depacking said compressed digital audio program signal;

a decoder for decompressing at least a first portion of depacketed said compressed digital audio program signal;

a memory for storing depacketed said compressed digital audio program signal;

a formatter for retrieving and reformatting stored compressed digital audio program signal for output to a second decoder; and wherein reformatted said compressed digital audio program signal includes data other than said at least first portion.

3. A receiver for packetized compressed multichannel digital audio program signals, comprising:

a depacketizer for unpacking said compressed multichannel digital audio program signals;

a decoder responsive to unpacked compressed multichannel digital audio program signal for providing decoded signals representing less than all of the channels of said multichannel digital audio program signals;

a formatter responsive to unpacked compressed multichannel digital audio program signal, for formatting unpacked compressed digital audio signal, representing at least some of the channels not decoded by said decoder, for output as compressed digital audio signal to an auxiliary decoder.

* * * * *